(12) United States Patent
Chen et al.

(10) Patent No.: US 12,272,110 B2
(45) Date of Patent: Apr. 8, 2025

(54) LIGHTWEIGHT REAL-TIME FACIAL ALIGNMENT NETWORK MODEL SELECTION PROCESS

(71) Applicant: L'OREAL, Paris (FR)

(72) Inventors: Zihao Chen, Toronto (CA); Zhi Yu, Toronto (CA); Parham Aarabi, Richmond Hill (CA)

(73) Assignee: L'OREAL, Paris (FR)

( * ) Notice: Subject to any disclaimer, the term of this patent is extended or adjusted under 35 U.S.C. 154(b) by 378 days.

(21) Appl. No.: 17/685,691

(22) Filed: Mar. 3, 2022

(65) Prior Publication Data

US 2022/0284688 A1 Sep. 8, 2022

Related U.S. Application Data

(60) Provisional application No. 63/155,839, filed on Mar. 3, 2021.

(30) Foreign Application Priority Data

Mar. 2, 2022 (FR) ...................................... 2201813

(51) Int. Cl.
*G06V 10/20* (2022.01)
*G06Q 30/0601* (2023.01)
(Continued)

(52) U.S. Cl.
CPC ......... *G06V 10/24* (2022.01); *G06Q 30/0631* (2013.01); *G06V 10/776* (2022.01);
(Continued)

(58) Field of Classification Search
CPC . G06V 10/24–87; G06V 10/776; G06V 40/16
See application file for complete search history.

(56) References Cited

U.S. PATENT DOCUMENTS

| | | | |
|---|---|---|---|
| 2013/0247175 A1* | 9/2013 | Nechyba | G06V 40/16 726/19 |
| 2020/0265484 A1* | 8/2020 | Caggiano | H04L 51/10 |
| 2020/0342209 A1* | 10/2020 | Li | G06N 3/082 |

OTHER PUBLICATIONS

Cole Murray, Deep Learning CNN's in Tensorflowwith GPUs, Published in HackerNoon.com (Year: 2017).*

(Continued)

*Primary Examiner* — Barbara D Reinier
(74) *Attorney, Agent, or Firm* — Oblon, McClelland, Maier & Neustadt, L.L.P.

(57) ABSTRACT

With Convolutional Neural Networks (CNN), facial alignment networks (FAN) have achieved significant accuracy on a wide range of public datasets, which comes along with larger model size and expensive computation costs, making it infeasible to adapt them to real-time applications on edge devices. There is provided a model compression approach on FAN using One-Shot Neural Architecture Search to overcome this problem while preserving performance criteria. Methods and devices provide efficient training and searching (on a single GPU), and resultant models can deploy to run real-time in browser-based applications on edge devices including tablets and smartphones. The compressed models provide comparable cutting-edge accuracy, while having a 30 times smaller model size and can run 40.7 ms per frame in a popular browser on a popular smartphone and OS.

15 Claims, 12 Drawing Sheets

(51) Int. Cl.
G06V 10/24 (2022.01)
G06V 10/70 (2022.01)
G06V 10/776 (2022.01)
G06V 10/82 (2022.01)
G06V 40/16 (2022.01)

(52) U.S. Cl.
CPC .............. *G06V 10/82* (2022.01); *G06V 10/87* (2022.01); *G06V 40/16* (2022.01)

(56) References Cited

OTHER PUBLICATIONS

Coskun, Face Recognition Based on Convolutional Neural Network (Year: 2017).*
Zhong et al., Face Attribute Prediction Using Off-the-Shelf CNN Features, IEEE (Year: 2016).*
French Preliminary Search Report issued Oct. 11, 2022 in French Patent Application No. 2201813 (with English translation of Category of Cited Documents), 12 pages.
Christos Sagonas et al., "300 Faces in-the-Wild Challenge: The first facial landmark localization Challenge", Mar. 6, 2014, 7 pages.
Hanxiao Liu et al., "DARTS: Differentiable Architecture Search", Apr. 23, 2019, 13 pages.
Marek Kowalski et al., "Deep Alignment Network: A convolutional neural network for robust face alignment", Aug. 10, 2017, 10 pages.
Yukang Chen et al., "DetNAS: Backbone Search for Object Detection", Dec. 30, 2019, 12 pages.
Beier Zhu et al., "Fast and Accurate: Structure Coherence Component for Face Alignment", Jun. 21, 2020, 18 pages.
Vladimir Nekrasov et al., "Fast Neural Architecture Search of Compact Semantic Segmentation Models via Auxiliary Cells", May 17, 2019, 15 pages.
TianXing Li et al., "Lightweight Real-time Makeup Try-on in Mobile Browsers with Tiny CNN Models for Facial Tracking", Jun. 5, 2019, 4 pages.
Wayne Wu et al., "Look at Boundary: A Boundary-Aware Face Alignment Algorithm", May 26, 2018, 10 pages.
Kaiming He et al., "Mask R-CNN", Jan. 24, 2018, 12 pages.
Andrew G. Howard et al., "MobileNets: Efficient Convolutional Neural Networks for Mobile Vision Applications", Apr. 17, 2017, 9 pages.
Mark Sandler et al., "MobileNetV2: Inverted Residuals and Linear Bottlenecks", Mar. 21, 2019, 14 pages.
Barret Zoph et al., "Neural Architecture Search With Reinforement Learning", Feb. 15, 2017, 16 pages.
Han Cai et al., "Once-for-All: Train One Network and Specialize It for Efficient Deployment", Apr. 29, 2020, 15 pages.
Vahid Kazemi et al., "One Millisecond Face Alignment with an Ensemble of Regression Trees", Sep. 25, 2014, 8 pages.
Sen Yang et al., "Pose Neural Fabrics Search", Dec. 5, 2020, 13 pages.
Esteban Real et al., "Regularized Evolution for Image Classifier Architecture Search", Feb. 16, 2019, 16 pages.
Zhiwei Liu et al., Semantic Alignment: Finding Semantically Consistent Ground-truth for Facial Landmark Detection, Mar. 26, 2019, 10 pages.
Alejandro Newell, et al., "Stacked Hourglass Networks for Human Pose Estimation", Jul. 26, 2016, 17 pages.
International Search report issued Jul. 15, 2022 in PCT/EP2022/055446, 5 pages.
Written Opinion of the International Searching Authority issued Jul. 15, 2022 in PCT/EP2022/055446, 10 pages.
Li, N., et al., "Shift-invariant Convolutional Network search", 2020 International Joint Conference on Neural Networks (IJCNN), IEEE, Jul. 19, 2020 (Jul. 19, 2020), pp. 1-7, XP033831758, DOI: 10.1109/IJCNN48605.2020.9207437 [retrieved on Sep. 25, 2020].
Li, T., et al., "Lightweight Real-time Makeup Try-on in Mobile Browsers with tiny CNN Models for Facial Tracking", ARXIV.org, Cornell University library, 201 Olin Library Cornell University Ithaca, NY 14853, Jun. 5, 2019 (Jun. 5, 2019), XP081373608, cited in the application.
Li, J., et al., "Neural Architecture Search on Acoustic Scene Classification", ARXIV.org, Cornell University library, 201 Olin Library Cornell University Ithaca, NY 14853, Aug. 5, 2020 (Aug. 5, 2020), XP081733030.
Chu, X., et al., "MixPath: A Unified Approach for One-Shot Neural Architecture Search", ARXIV.org, Cornell University library, 201 Olin Library Cornell University Ithaca, NY 14853, Jan. 16, 2020 (Jan. 16, 2020), XP081580153.
Han, C., et al., "Once-for-All: Train one Network and Spe-cialize it for Efficient Deployment", Apr. 29, 2020 (Apr. 29, 2020). XP055920272, Retrieved from the Internet: URL: https://arxiv.org/pdf/1908.09791.pdf [retrieved on May 11, 2022].
Yusoff, Y., et al., "Overview of NSGA-II for Optimizing Machining Process Parameters", Procedia Engineering, vol. 15, Dec. 6, 2011 (Dec. 6, 2011), pp. 3978-3983, XP028338067.
Huang, S-Y., et al., "PONAS: Progressive One-Shot Neural Architecture Search for Very Efficient Deployment", ARXIV.org. Cornell University Library, 201 Olin Library Cornell University Ithaca, NY 14853, Mar. 11, 2020 (Mar. 11, 2020), XP081639810.

* cited by examiner

300 

---

Algorithm 1 Evolutionary Search

---

1: arguments: base model $B$, relative accuracy threshold $T$, initial population $P_{init}$, evolve for $C$ cycles, $S$ samples per cycle
2: $population, history \leftarrow$ empty queue, $\emptyset$
3: $B_{Acc}, B_{time} \leftarrow$ ESTIMATOR($B$)
4: accuracy threshold $T_{acc} \leftarrow B_{acc} + T$
5: while $|population| < P_{init}$ do
6:     child $child \leftarrow$ EVOLVE($B$)
7:     $child_{acc}, child_{time} \leftarrow$ ESTIMATOR($child$)
8:     if $T_{acc} < child_{acc}$ then
9:         add $child$ to the right of $population$
10:        add $child$ to $history$
11:     end if
12: end while
13: while $|history| < C$ do
14:     $candidates \leftarrow$ SAMPLE($population, S$)
15:     $parent \leftarrow$ fastest model in $candidates$
16:     child $child \leftarrow$ EVOLVE($parent$)
17:     $child_{acc}, child_{time} \leftarrow$ ESTIMATOR($child$)
18:     if $T_{acc} < child_{acc}$ then
19:         add $child$ to tail of $population$
20:        add $child$ to $history$
21:     end if
22:     remove the oldest model from the left of $population$
23: end while
24: return fastest model in $history$

LIGHTWEIGHT REAL-TIME FACIAL ALIGNMENT NETWORK MODEL SELECTION PROCESS

CROSS-REFERENCE

This application claims a benefit of U.S. Provisional Application No. 63/155,839, filed Mar. 3, 2021, the entire contents of which are incorporated herein by reference. This application also claims priority to French Patent Application No. 2201813, filed Mar. 2, 2022, the entire contents of which are incorporated herein by reference.

FIELD

This application relates to improving computer processing, image processing, and neural networks for image processing and more particularly to a systems, methods and techniques for lightweight real-time facial alignment with one-shot neural architecture search (NAS).

BACKGROUND

Face alignment is a popular computer vision task that localizes facial landmarks on human faces. This technology is widely used as a building block in various kinds of face related industry applications such as live face tracking, three dimensional (3D) face geometry estimation, and facial feature extraction. When applying a designed artificial intelligence (AI) model to a real world application, computational speed and accuracy are the major bottlenecks because of the limited resources on edge devices (e.g. personal computing devices including tablets and smartphones). Cloud computing provides a solution that can boost the inference time of an AI model while maintaining good accuracy, however a cloud-based solution suffers from privacy and stability problems. Other solutions use manually designed mobile-targeted models (Howard et al. 2017) (Sandler et al. 2019) to reduce the computational time, but such models do not provide competent enough results compared to a carefully designed model that targets only on face alignment.

Thus, with Convolutional Neural Networks (CNN), facial alignment networks (FAN) have achieved significant accuracy on a wide range of public datasets, which comes along with larger model size and expensive computation costs, making it infeasible to adapt them to real-time applications on edge devices.

SUMMARY

With CNN, facial alignment networks have achieved significant accuracy on a wide range of public datasets, which comes along with larger model size and expensive computation costs, making it infeasible to adapt them to real-time applications on edge devices. There is provided a model compression approach on FAN using One-Shot Neural Architecture Search to overcome this problem while preserving performance criteria. Methods and devices provide efficient training and searching (on a single GPU), and resultant models can deploy to run real-time in browser-based applications on edge devices including tablets and smartphones. The compressed models provide comparable cutting-edge accuracy, while having a 30 times smaller model size and can run 40.7 ms per frame in a popular browser on a popular smartphone and OS.

There is provided in an embodiment, a method defining a face alignment network (FAN) model, wherein defining comprises: generating a set of candidate submodels from a network structure through training the network structure using i) a training dataset; and ii) expand and shrink training (EST) operations, which EST operations define and retain candidate submodel instances of various structure parameters with which to define the set of candidate submodels; and performing an evolutionary search of the candidate submodels using speed and accuracy evaluation criteria to select the FAN model from the candidate submodels.

In an embodiment, the FAN model is defined for run-time execution by an edge device to process facial images.

In an embodiment, the EST operations initiate training from a baseline model previously defined in accordance with the network structure. In an embodiment, EST operations utilize pre-trained parameters from the baseline model as partially trained parameters in each of the candidate submodels for further training using EST operations. In an embodiment, the candidate submodels are further trained for any one of: between 2 epochs and 60 epochs; between 2 and 25 epochs; and 2 epochs.

In an embodiment, the EST operations activate random subnets in each training iteration to train partial weights of subnets as integral and to train the sharing weights effectively among submodels.

In an embodiment, the EST operations define a search space for generation of candidate submodels in accordance with a plurality of search dimensions comprising: Depth size; Kernel size; Channel ratio; and Expansion ratio. In an embodiment, the EST operations initiate with a small depth size, a small kernel size, a large channel ratio, and a large expansion ratio and then operations, in phases and in the following order, gradually expand depth size and kernel size to respective maximums and, at ending phases, progressively shrink channel ratio and expansion ratio to respective minimums. In an embodiment, the EST operations comprise kernel training operations in an early phase that train a first size kernel and use the first size kernel to subsequently train a second size kernel where the first size kernel is a center of the second size kernel.

In an embodiment, the EST operations comprise depth training operations in a middle phase that train fewer layers and then gradually add larger layer options to the training.

In an embodiment, the EST operations comprise channel ratio and expansion ratio training operations that shrink channel ratio and expansion ratio respectively at end phases.

In an embodiment, the evolutionary search evaluates the baseline model to determine the speed and accuracy evaluation criteria. In an embodiment, the evolutionary search evolves from the baseline model to define a population of candidate submodels for subsequent sampling and evaluation.

As noted, in an embodiment, the evolutionary search uses speed and accuracy evaluation criteria to select the FAN model from the candidate submodels. In an embodiment, the evolutionary search: performs a plurality of cycles comprising: sampling from the population to select a quantity of candidate submodels; selecting an optimal submodel from the quantity of candidate submodels according to at least some of the speed and accuracy evaluation criteria; evolving the optimal submodel to determine a related submodel; removing an oldest submodel from the population; and if the related submodel satisfies a threshold test associated with the speed and accuracy evaluation criteria: adding the related submodel to the population for availability to subsequently sample and adding the related submodel to a set of final candidate submodels. Following the performance of the plurality of cycles, the search selects one submodel from the set of final candidate submodels as the FAN model, in accordance with final selection criteria.

In relation to speed criteria, in an embodiment, the optimal submodel is a fastest submodel of the quantity of candidate submodels in accordance with a speed criteria, the threshold test is a speed threshold test, and the one submodel is the fastest of the set of final candidate submodels.

In relation to accuracy criteria, in an embodiment, the optimal submodel is a most accurate of the quantity of candidate submodels in accordance with an accuracy criteria, the threshold test is an accuracy threshold test, and the one submodel is the most accurate of the set of final candidate submodels.

In an embodiment, the network structure is a two-stage structure outputting to a Region of Interest (RoI) alignment layer to refine extracted features for prediction. In an embodiment, a first stage comprise four blocks and a second stage comprise one block, each block having a maximum of four layers each comprising an inverted residual layer.

In an embodiment, the method comprises defining an application comprising the FAN model for execution by an edge device. In respective embodiments, the application is any one of: a make-up simulation application to simulate the trying on of make-up products on the face; a skin analysis application to analyze and score a region or regions of the face for at least one skin sign; an effects simulation application to simulate a graphical effect associated with a region of the face; and a facial tracking application to track and indicate a location of a face.

In an embodiment, the application is configured to process a video by the FAN model. In an embodiment, the edge device is a smartphone or tablet and the FAN model is configured for execution by a graphics processing unit (GPU). In an embodiment, the application is the make-up simulation application or the skin analysis application and the application is configured to provide an interface to an ecommerce purchase service to purchase a product or service associated to, respectively, make-up and skin treatment.

In an embodiment, the application is the make-up simulation application or the skin analysis application and the application is configured to provide an interface to an ecommerce recommendation service that recommends a product or service associated respectively to make-up and skin treatment.

There is provided, in an embodiment, a computing device comprising a processing unit coupled to a storage device storing instructions that, when executed by the processing unit, cause the computing device to perform a method according to any one of the method embodiments.

There is provided, in an embodiment, a computer program product comprising a non-transitory storage device storing instructions defining a FAN model for execution by a processing unit of a computing device, the FAN model defined in accordance with a method of any one of the method embodiments.

There is provided, in an embodiment, a computer device comprising a processing unit coupled to a storage device storing instructions that, when executed by the processing unit, cause the computing device to provide a FAN model defined in accordance with a method of any one of the method embodiments.

BRIEF DESCRIPTION OF THE DRAWINGS

FIG. 3 is a listing of pseudocode for an evolutional search process in accordance with an embodiment.

DETAILED DESCRIPTION

Related Work
Facial Landmark Alignment

The long history of face alignment first begins with classical computer vision, the ensemble of regression trees algorithm (Kazemi and Sullivan 2014) gives a fast and acceptably accurate solution for early stage's real-time face tracking. These methods achieved reasonable results with immensely large model size.

Recent CNN solutions for face alignment achieved outstanding performance on accuracy. Most of works using stacks of hourglass structures (Newell, Yang, and Deng 2016) (Liu et al. 2019) (Kowalski, Naruniec, and Trzcinski 2017) with heat maps. These kinds of methods remarkably boost the accuracy of the landmarks while these cascaded structures are still cumbersome.

The efficient models targeted on mobile and embedded vision applications like MobileNet (Howard et al. 2017) and MobilenetV2 (Sandler et al. 2019) run smoothly and have good performance. There is still some room for improvement in accuracy and speed for FANs.

Neural Architecture Search

The early NAS works (Zoph and Le 2017) make significant improvements on classification task results but take more than 1000 GPU days to search. As the searching cost results from repetitive training of sampled models, One-Shot NAS approaches (Liu, Simonyan, and Yang 2019) (Cai et al. 2020) propose to train a supermodel that covers all the parameters of sample models. This method reduces the search time to less than 7 GPU days, making it practical to do NAS under deployment scenarios.

Along with the efficient search on classification tasks, the NAS methods are also adapted to object detection (Chen et al. 2019), segmentation (Nekrasov et al. 2019) and pose estimation (Yang, Yang, and Cui 2020). No work has been done on the cross field of NAS and FAN before, but it shares similarities with detection works (Chen et al. 2019) that searches on backbone and bottlenecks.

EMBODIMENTS

CNN Model Architecture

In accordance with an embodiment, a two-stage CNN structure is used similar to that as proposed by (Li et al., Lightweight Real-time Makeup Try-on in Mobile Browsers with Tiny CNN Models for Facial Tracking, 2019 available at URL arxiv.org/abs/1906.02260, and filed as U.S. patent application Ser. No. 16/854,993 on Apr. 22, 2020, entitled CONVOLUTION NEURAL NETWORK BASED LANDMARK TRACKER, both of which references are incorporated herein by reference).

Figure 1:
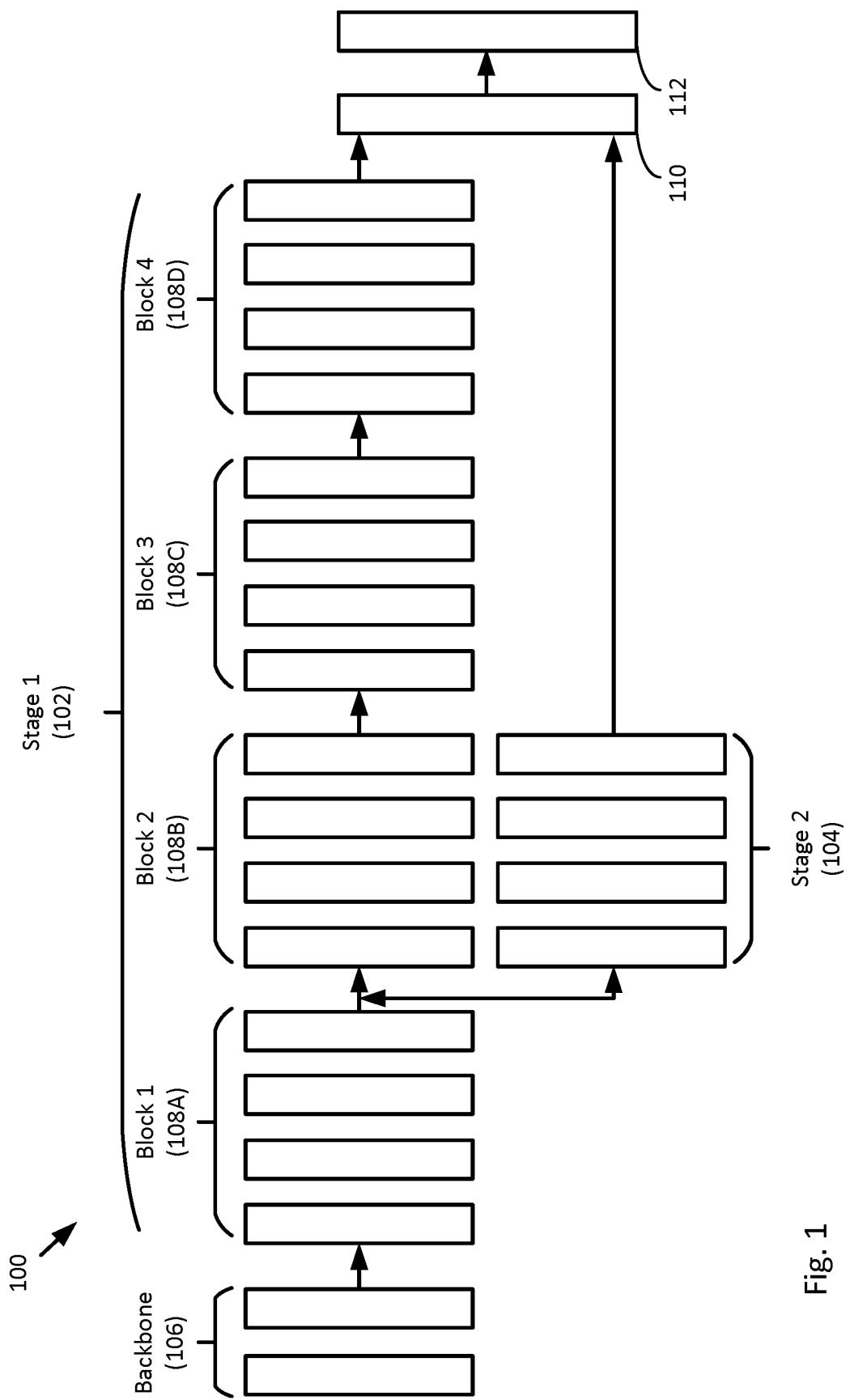
FIG. 1 is a simplified illustration of the two-stage CNN structure in accordance with an embodiment.

FIG. 1 is a simplified illustration of the two-stage CNN structure 100 in accordance with an embodiment. CNN structure 100 shows Stage 1 (102) and Stage 2 (104). Stage 1 is feed by a Backbone 106 and comprises four blocks (Block 1 (108A), Block 2 (108B), Block 3 (108C) and Block 4 (108D). Stage 2 receives output from Block 1. CNN structure 100 uses a Region of Interest (RoI) align layer 110 to extract features with Stage 1's output so as to refine the features for prediction at 112. CNN structure 100 also represents outputs of the network with heatmaps. In accordance with the embodiment, pixelwise sigmoid cross entropy and the normal L2 loss are used (during model training) as suggested in the references.

In accordance with the embodiment, the layers (e.g. of Backbone, Blocks 1-4 and the lone block of Stage 2) are inverted residual layers. With the following exceptions the layers use stride=1 and keep the same number of channels within one block: i) the layers of Backbone (106) are convolutional with s=2 in the first layer and c=16 in the second layer; ii) the first layer of Block 1 (108A) has s=2 and c=24; the first layer of Block 2 (108B) has s=2 and c=32; the first layer of Block 3 (108C) has s=2 and c=64; the first layer of Block 4 (108D) has s=1 and c=96; the first layer of Stage 2 (104) has s=1 and c=32 (where c denotes channel and s denotes stride).

Search Space

In accordance with an embodiment, a deployed model according to the CNN structure 100 is using part of MobileNetV2 (Sandler et al. 2019) as its first stage. This deployed model is referred to as the baseline model in the following sections. A goal is to compress the model size of this baseline model by searching on similar structures. Therefore, inverted residual layer were used as the fundamental component of the model as described with reference to FIG. 1.

In accordance with embodiments, layer depth per block can be chosen from [2, 3, 4], the expansion rate of layers from [3, 5, 6], the kernel size from [3, 5], and the blockwise channel ratio from [0.7, 0.8, 0.9, 1.0]. This channel ratio, multiplied with the base channel numbers, can add more variations to the search space. In total, a search space contains $(((2 \times 3)^2 + (2 \times 3)^3 + (2 \times 3)^4) \times 4)^5 \approx 9 \times 10^{18}$ different submodels.

The largest submodel, obtained by choosing the largest option from each search dimension, is the supermodel. Each sampled model from this search space, including the baseline model, can be regarded as a subset of the supermodel.

One Shot NAS with Expand & Shrink Training

With choosing the maximum of each search dimension (described in the previous section), in accordance with an embodiment, the supermodel has 1.14 M parameters. Under the one-shot NAS approach to training, the supermodel is trained only once (e.g. the supermodel is not again trained during a search phase), and its pretrained weights are provided to all the sampled models instead of training them from scratch. Sampled models here references those submodels generated during the initial training phase that are sampled during the search phase in accordance with the supermodel.

Therefore, although the supermodel needs a longer time to train (e.g. compared to a model of a similar structure under more typical approaches to training), once it is completed, the search time for each sampled model will be O(1) instead of O(N).

Training the supermodel as a whole is a naive approach. It is straightforward, but the shared weights are not optimized for different submodels, and thus are unpromising (later discussed in relation to FIG. 4C). The weights are trained integrally for the supermodel to work as a whole. To optimize all the subnets simultaneously, a method from Once-For-All (OFA, (Cai et al. 2020)) is adapted, and a new Expand & Shrink Training (EST) strategy is proposed, in accordance with an embodiment. While both OFA and EST (as introduced herein) work to solve a same problem—make the weights in the supermodel work when they are only partially activated—EST shows improved results as demonstrated.

The following example illustrates the problem generally and in a simplified manner. Assume there is a supermodel with layers A, B and C. It is desired to have not only the whole supermodel (i.e. ABC) to work, but also submodels AB, BC (partially) to work. Each of OFA and EST activates random subnets in each training iteration to train partial weights integrally. Each focuses on how to train the sharing weights effectively among submodels, but using different approaches. Referencing the example supermodel of layers ABC again: typical training trains ABC as an integral, which means all the parameters in ABC update at the same time, and at a same direction which is based on the output of A→B→C→. Hence, to train partial weights integrally means, for a submodel defined only by the AB layers in the supermodel, such layers may be considered to be an independent model to train. Therefore, when training this submodel, only AB weights are updated, and the direction of update is based on the output of A→B→. The weights in C are still there (e.g. in the supermodel), but are ignored (they are not activated) and a training focus is limited to only A and B. A similar approach is taken for submodel BC, where only these layers are trained integrally, ignoring layer A.

Figure 2A:
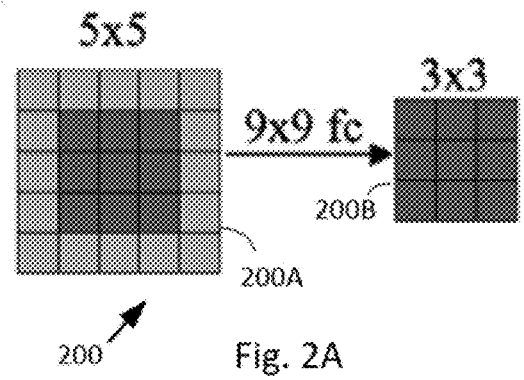
FIGS. 2A, 2B, 2C, 2D and 2E are block diagrams that illustrate a comparison between One For All (OFA) training operations and Expand & Shrink Training (EST) operations in accordance with an embodiment.
Figure 2B:
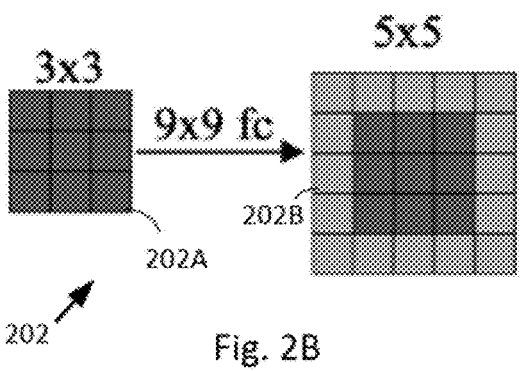
Figure 2C:
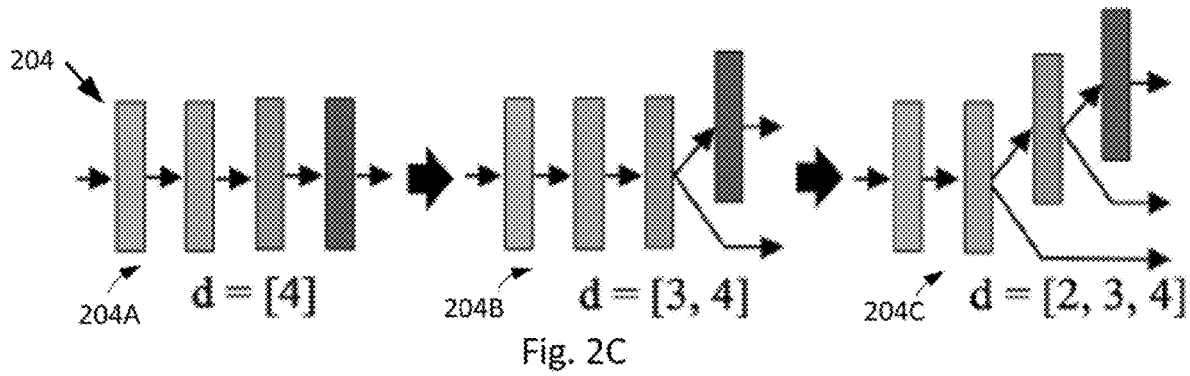
Figure 2D:
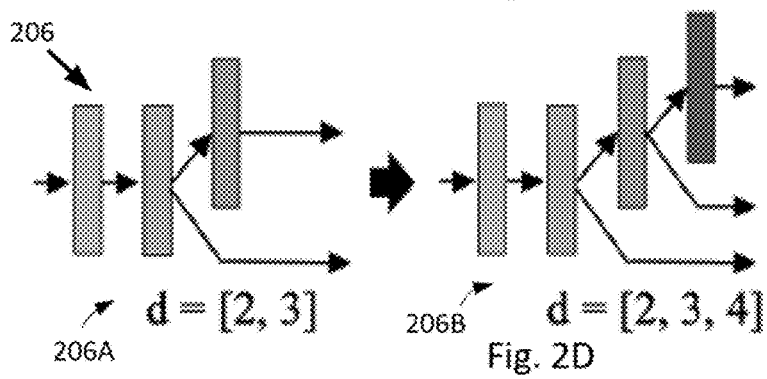
Figure 2E:
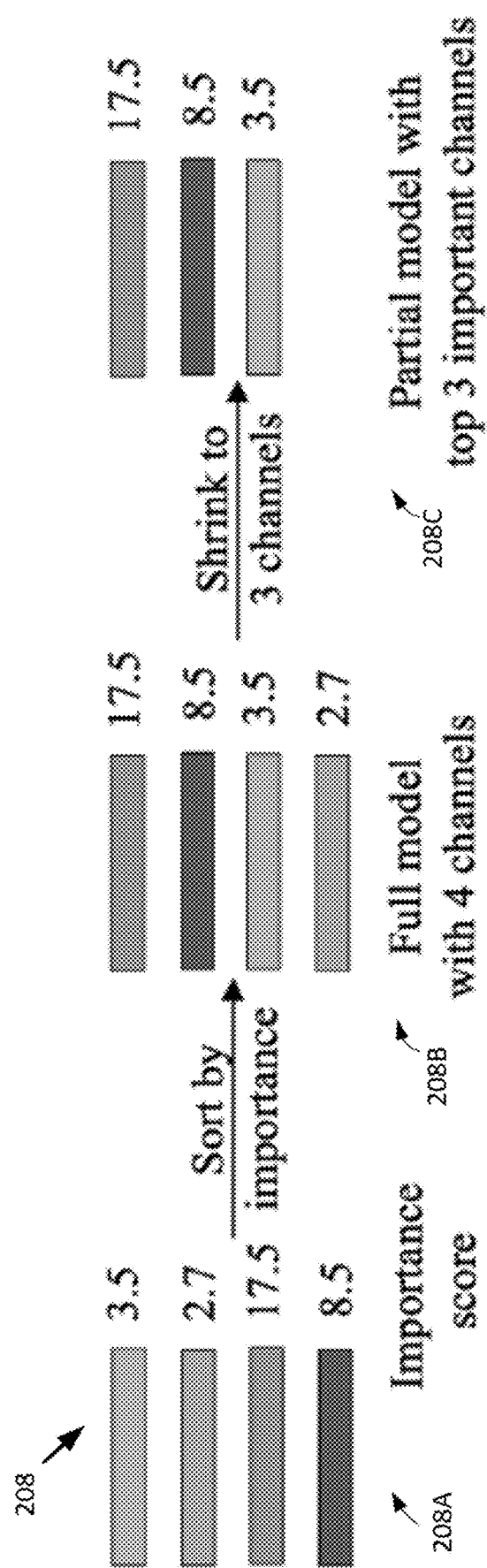

The approaches under OFA and EST are different in the details of solving the aforementioned problem. FIGS. 2A, 2B, 2C and 2D are block diagrams that make a comparison between OFA and EST as follows: FIG. 2A shows OFA kernel training operations 200, in accordance with an example. Operations 200 first show training 202A a 5×5 kernel, then applying a linear transformation to its center 3×3 to work as a 3×3 kernel 202B. FIG. 2B shows EST kernel training operations 202, in accordance with an example: Operations 202 are a reverse of operations 200: At 202A, operations train a 3×3 kernel first, and then regard it as the center of 5×5 kernel to train (202B). FIG. 2C shows OFA depth training operations 204, in accordance with an example: Operations 204 first train all the layers (204A), then progressively reduce (204B, 204C) the minimum layer option to allow more choices for smaller models; FIG. 2D shows EST depth training operations 206, in accordance with an example: Operations 206 first train with fewer layers (206A), and then gradually add larger layer options (206B) into search space; and FIG. 2E shows EST expansion and channel ratios selection operations 208, in accordance with an example: In OFA, when the expansion ratio is settled and C channels to be chosen from, then the top C most important (sum of L1 norm of channelwise weights) channels will be selected. EST follows this method for expansion ratios (208A, 208B), and further applies it to the blockwise channel ratio (208C).

To sum up, OFA tends to train weights of largest layers first and then shares the weights to train small layers progressively. In contrast, EST shrinks the layer size gradually for expansion ratios and channel ratios, but it expands the search options for depth and kernel size. (The advantages of EST over OFA are shown with reference to graphs 500 and 502 of FIGS. 5A and 5B and described below.)

Table 1 shows the five phases of EST, in accordance with an embodiment. The search dimensions include Depth (D), Kernel (K), Channel ratio (C), and Expansion ratio (E). Each of these dimensions expands or shrinks its searching scope accordingly at one of the five phases. The training order represented was demonstrated to achieve better results than different order.

EST starts with small depth and kernel size, and large channel and expansion ratios. Then EST gradually expands depth and kernel to maximum. At the ending phases, EST progressively shrinks channel and expansion ratios to a minimum. Remarkably, during the expand and shrink phases, the search options from previous phases are kept (e.g. expanding the search space of submodels for use when later searching). Therefore, the activated search space (of submodels) goes larger step by step as submodels are added according to EST operations, and larger and smaller submodels created using the EST operations have chances to be trained together. A further example is useful. In this example, there is a supermodel with four layers ABCD and for simplicity, the search space only has one search option, which is number of layers. When there is only one option for layer numbers to choose from, for example "4", the submodel will have exactly 4 layers which is the supermodel itself with ABCD; when the search space is enlarged by allowing "2,3,4" layers in the search options, then the submodels could be e.g. AB (2 layers), ABC (3 layers), ABCD (4 layers), etc. Thus, by allowing more search options ("2,3,4" vs "4"), there will be higher (more) chances that larger models (e.g. ABCD) could be trained with smaller models (AB, ABC).

TABLE 1

Five phases of Expand & Shrink Training.

|   | 1 Base | 2 Expand Depth | 3 Expand Kernel | 4 Shrink Channel | 5 Shrink Expansion |
|---|---|---|---|---|---|
| D | 2, 3 | 2, 3, 4 | 2, 3, 4 | 2, 3, 4 | 2, 3, 4 |
| K | 3 | 3 | 3, 5 | 3, 5 | 3, 5 |
| C | 1 | 1 | 1 | 0.7-1.0 | 0.7-1.0 |
| E | 6 | 6 | 6 | 6 | 3, 5, 6 |

Performance Evaluation and Estimation

In accordance with an embodiment, model compression is directed at least in part by deployment scenarios, and therefore both accuracy and speed of models are evaluated. A complete evaluation with training from scratch and running on edge devices is costly. To alleviate the evaluation cost, in accordance with an embodiment, estimators are implemented to predict their performance. These should give consistent performance rankings as in complete evaluations. In accordance with an embodiment, speed (time) estimation uses estimators developed to use FLOPS, Params and Memory Read & Write. (Correctness is illustrated with reference to graphs 400, 402, 404, and 406 of FIGS. 4A, 4B, 4C and 4D and described below.)

For the accuracy estimation, instead of training sampled model fully from scratch for N epochs, in an embodiment, great advantage is taken from EST operations. With EST, in an embodiment, partial weights of the supermodel are loaded to submodels and the submodels trained to converge them quickly. Also proved below and with reference to FIGS. 4A-4D, for a child sampled from the search space, loading the corresponding weights from supermodel and training it for 2 epochs is sufficient to give accurate estimation. This ensures the evaluation cost is O(1) rather than O(N).

Evolutionary Search

After the Expand & Shrink Training, an evolutionary search (ES) is conducted on the search space. In accordance with an embodiment, details of an evolutionary search are shown in FIG. 3 providing pseudocode for an Algorithm 1 (300). Different from the basic ES (Real et al. 2019), both $child_{acc}$ and $child_{time}$ are used for evaluate and search identification.

Algorithm 1 (300) shows the case of searching for speed, which samples models with an accuracy threshold and sorting for the fastest candidates; if a speed threshold were to be used instead, the size of sampled models can be compressed and the most accurate can be searched for. That is in the while loop of lines 13-23, parent at line 15 would be the most accurate model in candidates, line 18 would compare speed values and at the end line 24, the most accurate model would be returned from the set history comprising the most accurate model candidates generated from the loop lines 13-23.

Another difference, in an embodiment, is the generation of an initial population—the search is started by evolving from the baseline instead of random sampling (e.g. via an EVOLVE function at line 16). Subsequent evolution is performed on fastest (in an embodiment) submodels that were evolved from the baseline.

In the function of EVOLVE, there is randomness used to select different submodels from the search space. (Just as a same mother may give birth to different children, evolving a baseline model also results in different child models. In fact, the chance of two child models to be evolved in an identical way is almost like a mother give birth to twins). Because of the deployment purpose, the search looks for models with both better efficiency and accuracy. If random sampling were used, it is difficult to control the model sizes and compare accuracy with the baseline fairly.

Dataset

Figure 6A:
FIGS. 6A and 6B are images illustrating dataset annotations.
Figure 6B:
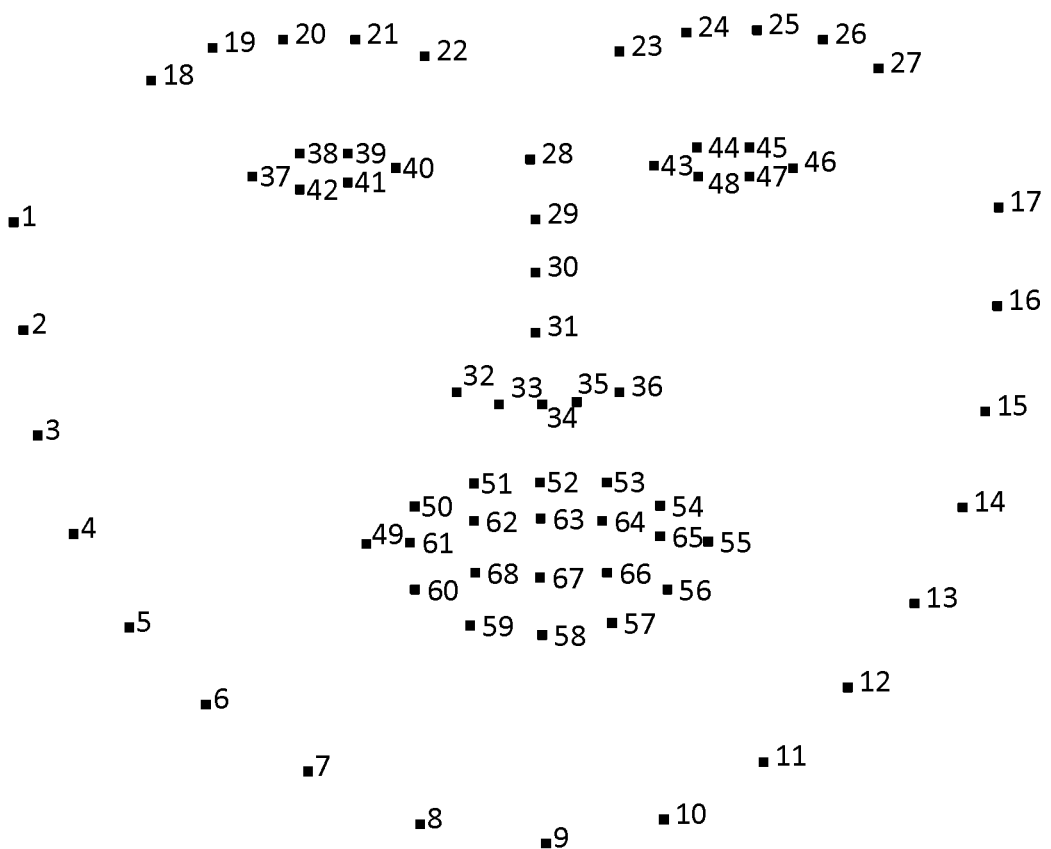

An in-house dataset (referred to as "Modi dataset") has 3681 images in total. Modi dataset has 62 inner points defining regions within the face and 3 contour points for each face. For application scenarios, the poses distribute from −30° to 30°. In an embodiment, the ESTNet model is separately trained on the 300W dataset (Sagonas et al. 2013) to conduct a fair comparison with the cutting-edge methods. The difference between the annotations of the Modi and 300W datasets is shown in images 600 and 602 of FIGS. 6A and 6B.

Results and Ablation Studies

Training and Searching

Figure 5A:
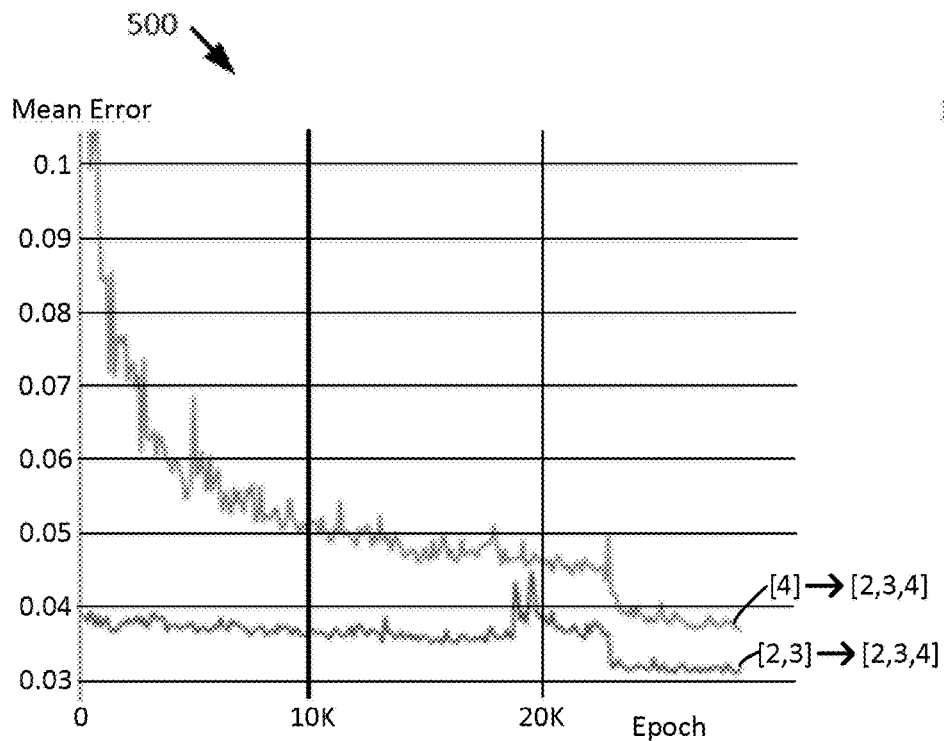
FIGS. 5A and 5B are graphs showing results of experiments in accordance with embodiments.
Figure 5B:
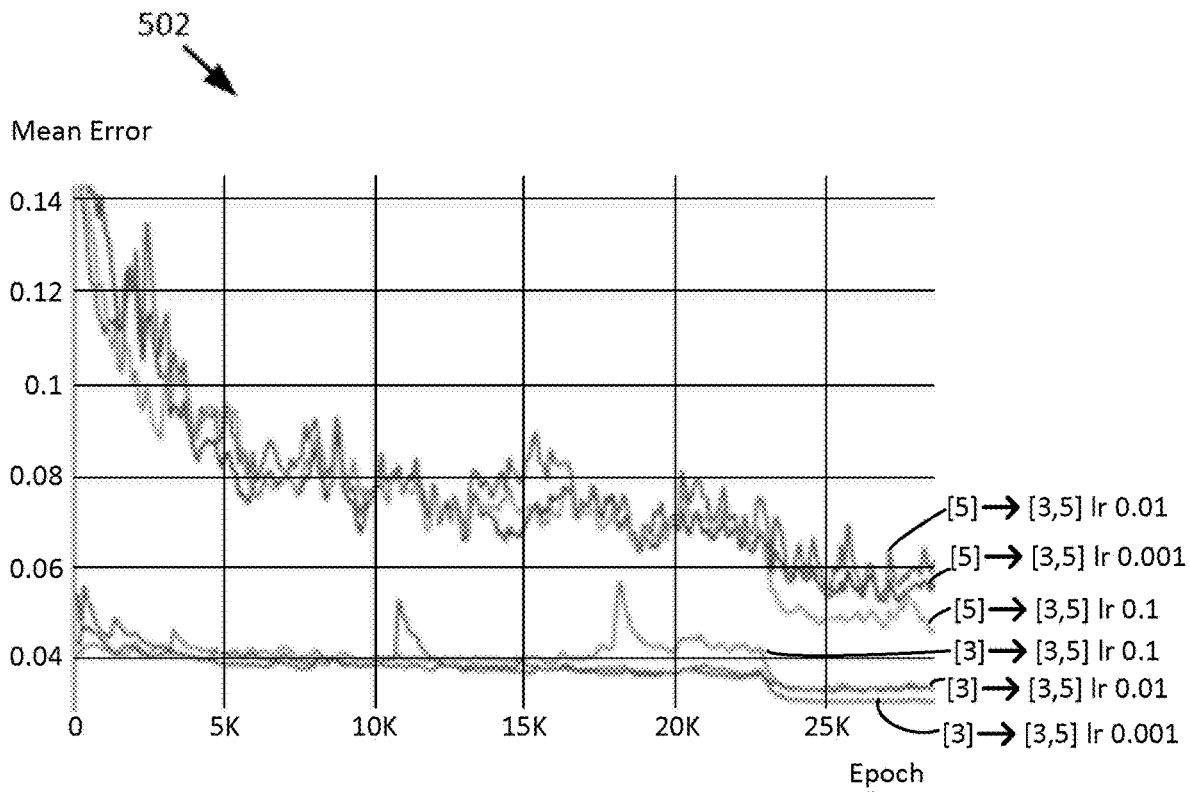

Previously discussed are differences between original OFA and the techniques of EST as disclosed herein. The following results show that EST expands work much better than OFA shrinks for depth and kernel in the FAN search space. In FIG. 5A (graph 500), training [2,3] depth and then [2,3,4], the error goes down to 0.031, while the error remains high if training from the full [4] layer first. In FIG. 5B (graph 502), the training starts with kernel size 3 or 5, and the learning rate is adjust for the transformation matrices.

The shrinking experiments cluster at a much higher error. As discussed, experiments where conducted to validate performance estimators. 17 randomly sampled models were evaluated with the actual performance and their performance rank compared to the estimations. Sample Pearson correlation coefficient (Freedman, Pisani, and Purves 2007) in Equation 1 is applied to evaluate the consistency of estimations and actual evaluations.

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

Figure 4A:
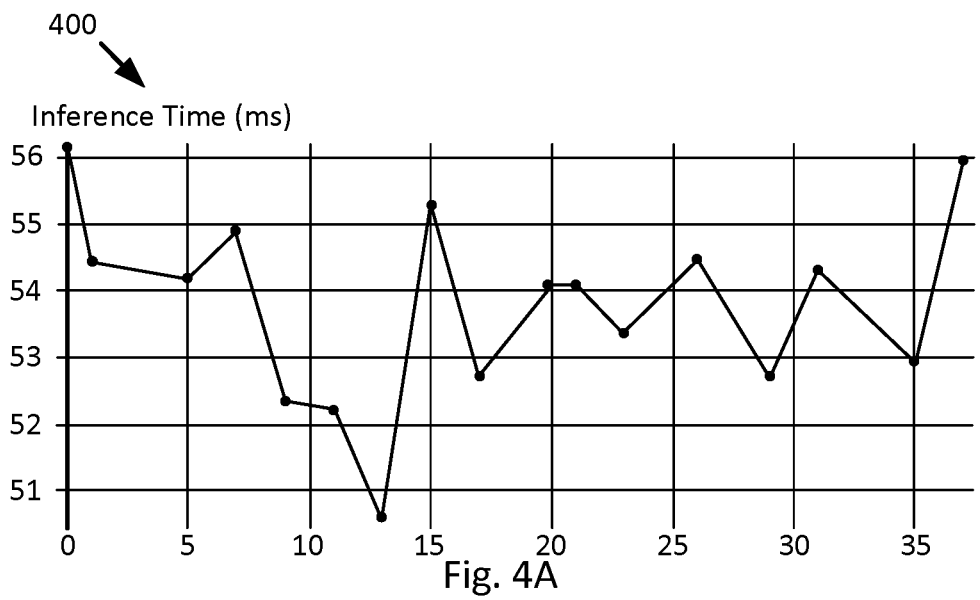
FIGS. 4A, 4B, 4C and 4D are graphs showing results of experiments in accordance with embodiments.
Figure 4B:
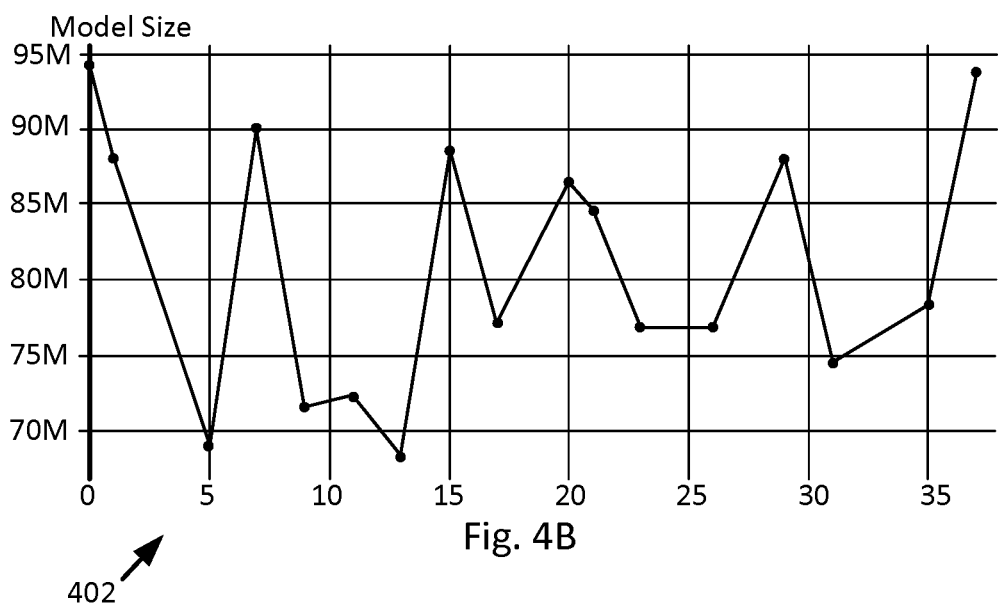

In FIG. 4A graph 400 shows the actual inference time and in FIG. 4B graph 402 shows the time estimation made by a weighted average of FLOPS, Params and Memory Read & Write. Using Equation 1, they have a strong correlation of 0.677 which validates the estimator.

Figure 4C:
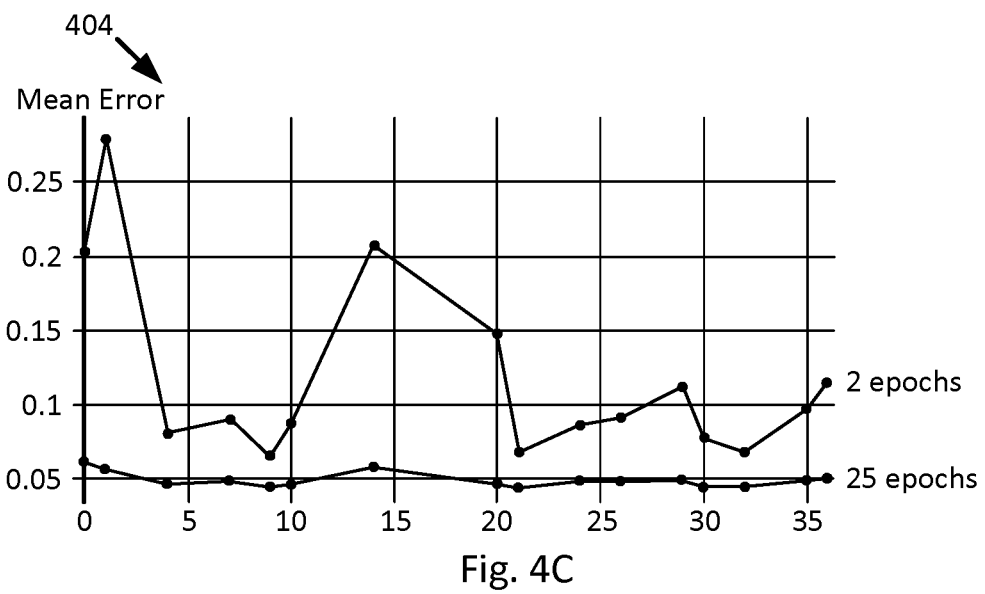
Figure 4D:
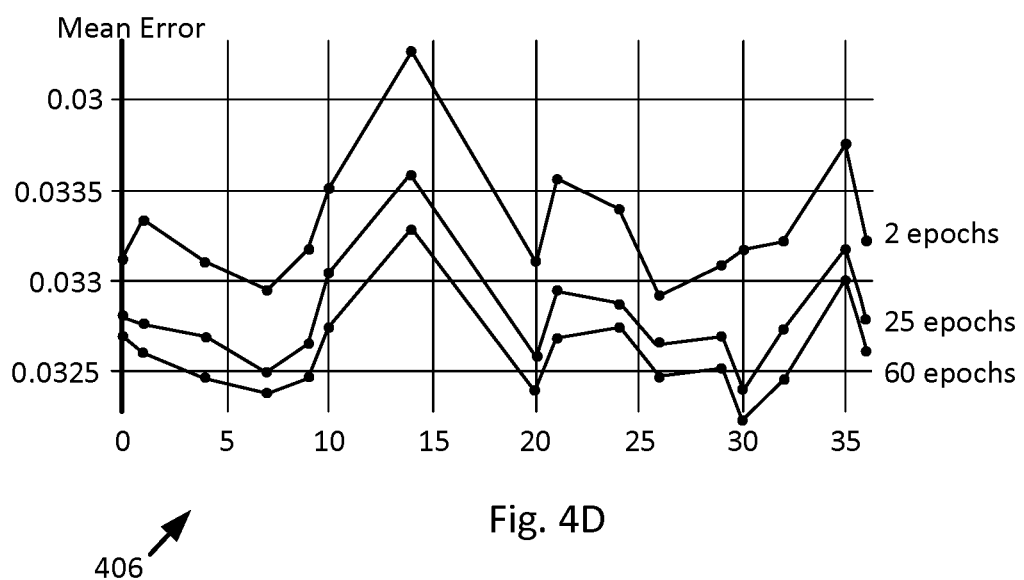

Graphs 404 and 406 of FIGS. 4C and 4D show the comparison of two supermodel training strategies, naive training and Expand & Shrink Training. In FIG. 4C, the models are loaded with naively-pretrained weights and trained for 2 and 25 epochs.

The correlation of accuracy ranking after tuning different epochs is only 0.151. Therefore the naive approach does not provide a good accuracy estimation.

In contrast, FIG. 4D uses the supermodel pretrained from Expand & Shrink Training strategy described above. The same models are trained for 2, 25 and 60 epochs, and the consistency of model accuracy ranks are very strong: the correlation coefficient for (2, 25), (25, 60), (2, 60) are 0.667, 0.916 and 0.819 correspondingly. This proves the effectiveness of EST, and that tuning models for 2 epochs is sufficient to estimate the accuracy performance.

Compared to the naive approach, EST provides a much better accuracy estimation without spending much more time. On one Tesla™ V-100 (a tensor core GPU from NVIDIA Corporation, Santa Clara, CA), the Expand & Shrink Training takes 40 hours, where the naive training also takes 36 hours to finish.

To sum up, this section proves the effectiveness of both time and accuracy estimators. It also shows the EST's advantages over the naive approach.

Search Results

Search results according to respective embodiments are shown in Table 2 and Table 3. α is a parameter multiplied with the channel numbers to customize for datasets with different complexity. Modi dataset uses α=0:5; the 300W dataset has more data so α=1:0 is used. All the computed errors in this section are computed by mean error with Inter-pupil Normalization. In an embodiment, operations search on the Modi dataset and obtain a best result, named ESTNet in Table 2. Its inner error and contour error on the test set are lower than the baseline model, and its model size is only 75% of the baseline. On different edge devices, ESTNet outperforms both on accuracy and speed.

TABLE 2

Results on Modi dataset with 65 points

| | | Baseline (α = 0:5) | ESTNet (α = 0:5) |
|---|---|---|---|
| Error | Inner Error | 3.14 | 3.10 |
| | Contour Error | 8.11 | 7.94 |
| Model Size | Params | 0.221M | 0.179M |
| | MemR + W | 126.30 MB | 89.06 MB |
| | FLOPS | 91.87M | 91.87M |

TABLE 2-continued

Results on Modi dataset with 65 points

| | | Baseline (α = 0:5) | ESTNet (α = 0:5) |
|---|---|---|---|
| Inference Time in Chrome(ms) | IPhone 11 | 28.42 | 26.97 |
| | Intel Core i5 | 50.45 | 47.56 |

In an embodiment, operations separately train ESTNet on 300W dataset to evaluate its robustness and generality. Showing in Table 3, its result are compared with the baseline and the state-of-the-art work, Look-at-Boundary (LAB, (Wu et al. 2018)). Params and FLOPS of 8-stack LAB are obtained from (Zhu et al. 2020). The 4-stack result is estimated by halving. The ESTNet outperforms the baseline on all of the common, challenging and full validation sets while reducing 25% of model Params. It also has comparable results with LAB. ESTNet runs 40.7 ms per frame in Chrome™ on IPhone™ 11 (trademarks of Apple Inc. Cupertino, CA) which is real-time. Given that LAB has 29.2 times more parameters and 50.2 times more FLOPS than ESTNet, LAB cannot run real-time, and this is the advantage of the compressed model ESTNet.

TABLE 3

Results on 300 W dataset with 68 points

| | Baseline (α = 1:0) | ESTNet (α = 1:0) | LAB 4-stack |
|---|---|---|---|
| Common Subset | 4.34 | 4.15 | 4.20 |
| Challenging Subset | 8.21 | 8.10 | 7.41 |
| Full Val Set | 5.24 | 5.01 | 4.92 |
| Params | 0.71M | 0.53M | 16.03M* |
| FLOPS | 380.73M | 278.80M | 14292M* |

Thus as shown in the embodiments, EST techniques, devices and method are proposed for developing a FAN model that runs real-time such as via a website (e.g. a web-browser based application) on devices specifically. Web-browser based applications are typically more constrained than a native (non-browser based) application. Web-browser based applications are commonly offered as the manner of distribution through web browsing is user friendly and may be user preferred compared to obtaining and installing a native application such as from an application distribution service (e.g. an application store).

Edge devices capable of running the FAN model include smartphones and tablets running common browsers and OSs (e.g. devices, browsers and OSs from Apple Inc. Cupertino, CA). In an embodiment model generated using the EST techniques herein, cutting-edge accuracy is achieved while having a 30 times smaller model size and running 40.7 ms in Chrome™ on IPhone™ 11.

Figure 7:
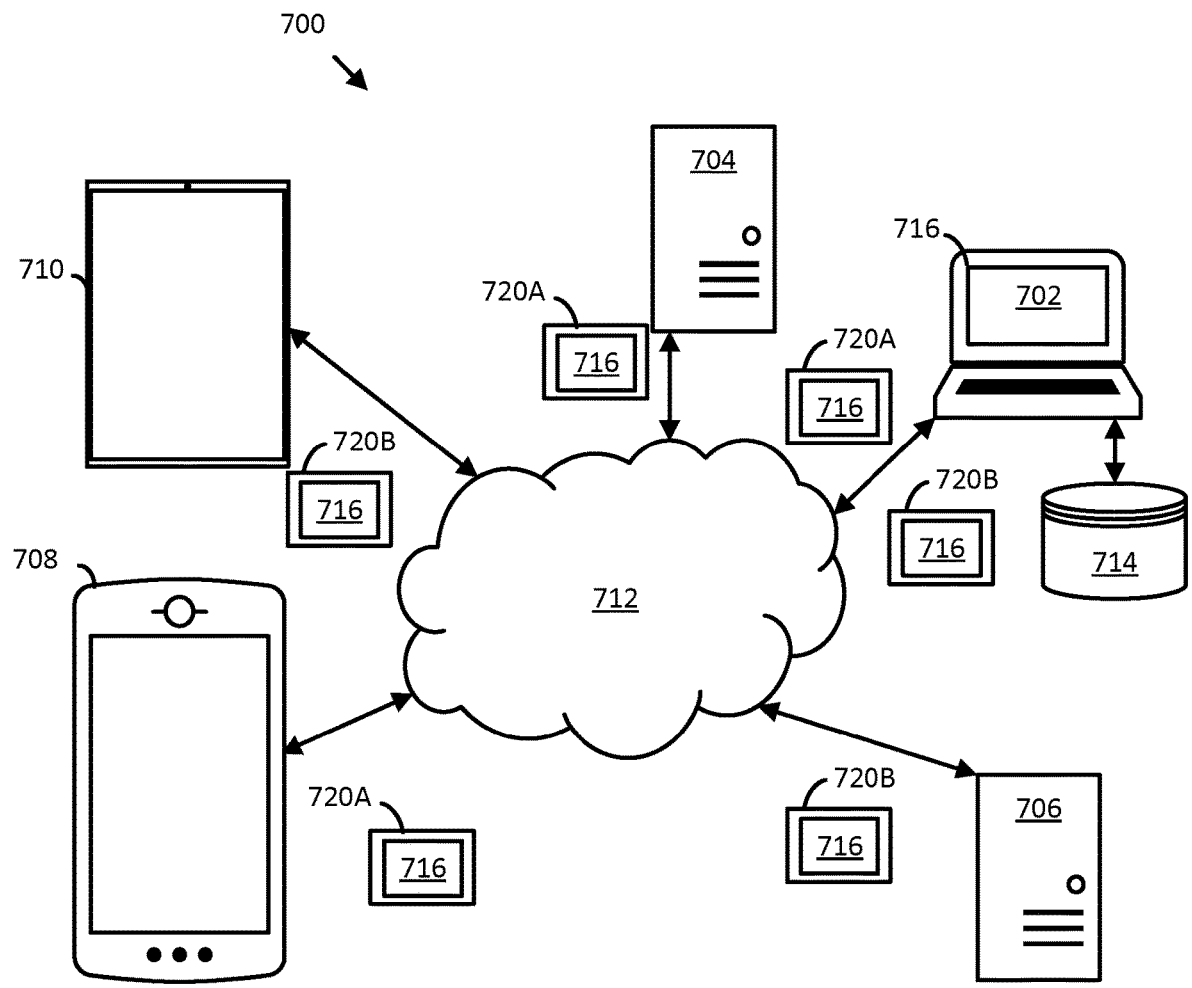
FIG. 7 is a drawing of a computer network showing a development computing device, a website computing device and edge computing devices, among others, in accordance with an embodiment.

FIG. 7 is a drawing of a computer network 700 showing a development computing device 702, a website computing device 704, an application distribution computing device 706 and respective edge computing devices, namely a smartphone 708 and a tablet 710, in accordance with an embodiment. The computing devices are coupled via communications network 712. The computer network 700 is simplified. For example, website computing device 704 and application distribution computing device 706 are example devices of respective website and application distribution systems.

Communications network 712 may comprise a plurality of wired and/or wireless networks, which may include private and public networks.

In the embodiment, development computing device 702 is coupled to a datastore 714 (which may include a database) storing one or more datasets such as for training and testing, etc. network models. Datastore 714 may store software, other components, tools, etc. to assist with development and implementation. In another embodiment, not shown, the datasets are stored on storage device of the development computing device 702. Development computing device 702 is configured to define a FAN model 716 in accordance with one or more of the embodiments as described herein. For example, development computing device 702 is configured to generate a set of candidate models from a network structure through training the network structure using i) a training dataset; and ii) expand and shrink training (EST) operations. The EST operations define and retain candidate model instances of various structure parameters with which to define the set of candidate models. The development computing device also performs an evolutionary search of the candidate models using speed and accuracy evaluation criteria to select the FAN model from the candidate models.

The development computing device 702 defines the FAN model to execute on edge devices such as smartphone 708 and a tablet 710. Development computing device 702 (or another, not shown) incorporates the FAN model 716 into an application 720A, such as for a website (for providing by website computing device 704) and/or an application 720B for the application distribution computing device (e.g. 706) for distribution to respective edge devices. In an embodiment, application distribution computing device 706 provides application store (e-commerce) services to distribute applications for execution on target devices running supported operating systems (OS). An example application distribution computing device is Apple's App Store™ for iPhone™ or iPAD™ devices running iOS™ or iPADOS™ (trademarks of Apple Inc. Cupertino CA). Another example is Google Play™ (trademark of Google LLC, Mountain View, CA) for smartphones and tablet devices from various sources that run Android™ OS (trademark of Google LLC, Mountain View, CA). In the embodiment, smartphone 708 receives application 720A with FAN model 716 from website computing device 704 and tablet 710 receives application 720B with FAN model 716 from application distribution computing device 706.

Figure 8:
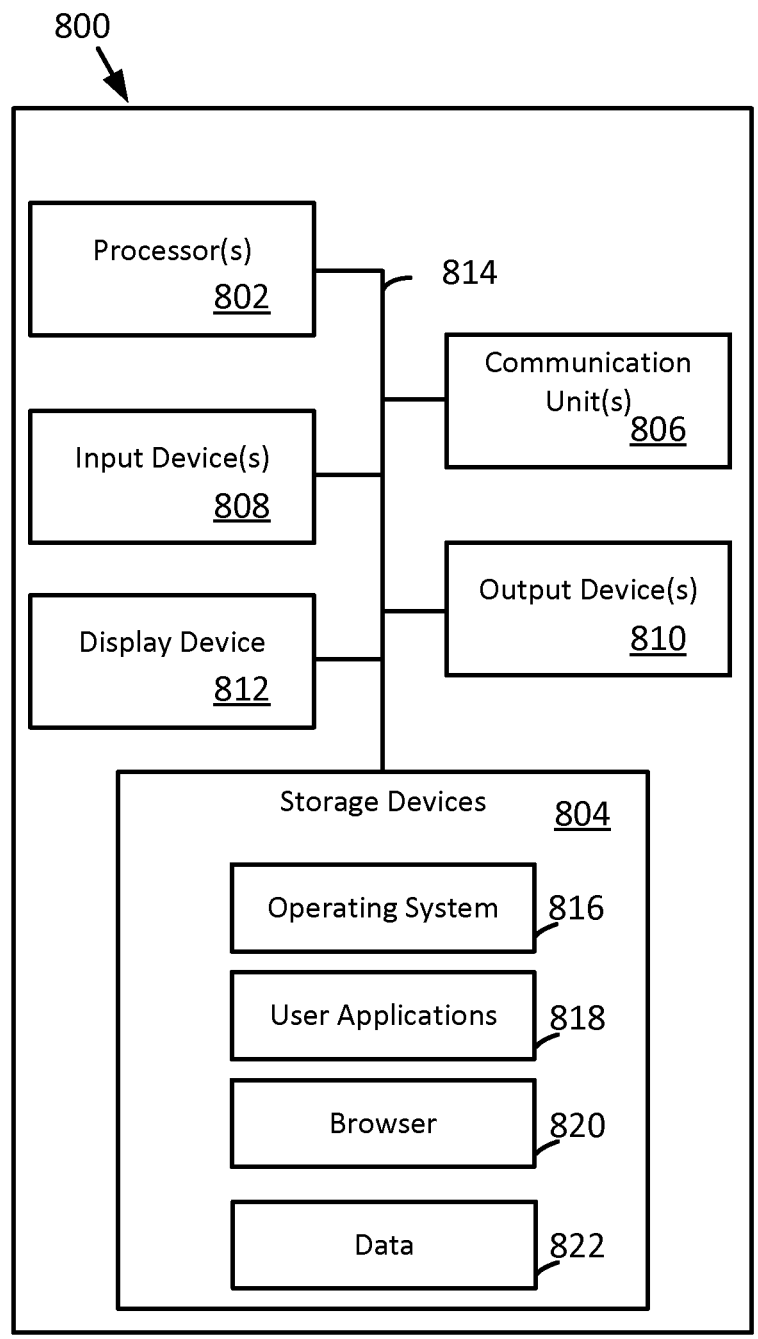
FIG. 8 is a drawing of a computing device, in accordance with an embodiment.

FIG. 8 is a block diagram of a representative computing device 800. The computing devices of FIG. 7 are configured similarly and in accordance with their respective needs and functions. Computing device 800 comprise a processing unit 802 (e.g. a CPU, and/or GPU, or other processor, etc., which in an embodiment comprises at least one processor), a storage device 804 (which in an embodiment is at least one storage device) coupled thereto storing computer-readable instructions (and data), which instructions when executed by the processing unit (e.g. a processor) cause operations of the computing device, for example to execute a method. A storage device 804 can include any of a memory device (e.g. RAM, ROM, EEPROM, etc.), a solid state drive (e.g. comprising semiconductor storage devices/ICs which can define a flash memory), a hard disk drive or other type of drive, and storage media such as tape, discs (e.g. CD-ROM, etc.) Additional components include: communications units 806 for coupling the device via wired or wireless means to a communications network, an input device 808; an output device 810, which may comprise a display device 812. In some examples the display device is a touch screen device providing an input/output device. Components of computing device 800 are coupled via an internal communications system 814, which may have external ports for coupling to additional devices.

In some examples, an output device comprises a speaker, a bell, a light, an audio output jack, fingerprint reader, etc. In some examples, the input device comprises a keyboard, a button, a microphone, a camera, a mouse or pointing device, etc. Other devices (not shown) may comprise a location determining device (e.g. GPS).

Storage device 804, in an example, stores an operating system 816, user applications 818 (of which application 720A or 720B may be one), a browser 820 (a type of user application) for browsing websites and running executables such as application 720A with FAN model 716 received from a website; and data 822, for example, images and/or video frames from a camera or otherwise received.

With continued reference to FIG. 7, in an example, a user of smartphone 708 uses a browser and visits a website offered by website computing device 704. Smartphone 708 receives application 720A with FAN model 716. In the example, the application is an effects simulation application such as a make-up try on application providing a virtual reality experience. The user uses a camera and obtains a still or video image (e.g. a selfie), which source image is processed by the application (e.g. using FAN model 716). The user chooses various effects to be applied such as via a graphical user interface. The effects are applied to the image(s) in real time using the regions of the face (e.g. facial landmarks as trained) identified through FAN model 716. Make up effects may be applied using an overlay to define an updated image from the source image. The updated image is displayed via display device and may be stored to storage device and shared (communicated) via social media, text message, email, etc. In an embodiment, the website computing device 704 is enabled for e-commerce services and facilitates purchases of make up such as the make up tried on virtually via application 720A. In an embodiment, website computing device 704 provides a recommendation service to recommend products.

In an embodiment, application 720A simulates effects of skin or other face treatment products. In an embodiment, application 720A simulates effects of skin or other facial treatment services. In an embodiment, website computing device 704 provides a recommendation service to recommend products. In an embodiment, the website computing device 704 is enabled for e-commerce services and facilitates purchases of such products and/or such services. In an embodiment, application 720A performs skin analysis and provides scoring of at least one skin sign (e.g. acne). Website computing device 704 may provide a product recommendation. Application 720A may simulate results or product use showing reduced skin sign effects.

With continued reference to FIG. 7, in an example, a user of tablet 710 uses a browser and visits a website offered by application distribution computing device 706. Tablet 710 receives application 720B with FAN model 716. In the example, the application is an effects simulation application such as to simulate a fanciful effect (e.g. a graphical effect) associated with the face providing a virtual reality experience. In an example, the effect is a filter applied to a selfie image. In an example, the effect simulates the face as a cartoon character using graphical effects. The user uses a camera and obtains a still or video image (e.g. a selfie), which source image is processed by the application (e.g. using FAN model 716). The user may chooses the character to be applied such as via a graphical user interface. The graphical effect or effects are applied to the image(s) in real time using the regions of the face identified through FAN model 716. Effects may be applied using an overlay to define an updated image from the source image. The updated image is displayed via display device and may be stored to storage device and shared (communicated) via social media, text message, email, etc.

In an embodiment, application 720B provides a make up try on application a treatment product simulation or a treatment service simulation (each a virtual or augmented reality experience). Application 720B, in an embodiment, is configured to direct device to an e-commerce service for recommendations and/or purchase facilitation.

In an example, an application is a video calling or conferencing application. Effects are applied in real time to images from a participant's camera using results of FAN model 716. The images with the effects applied are communicated via the video calling or conferencing service for communication to other caller/conferencing participants. Effects comprise make up effects, in an embodiment.

In examples, applications developed which include FAN model may comprise: a make-up simulation application to simulate the trying on of make-up products on the face; a skin analysis application to analyze and score a region or regions of the face for at least one skin sign; an effects simulation application to simulate an effect associated with a region of the face; a facial tracking application to track and indicate a location of a face, etc.

Figure 9:
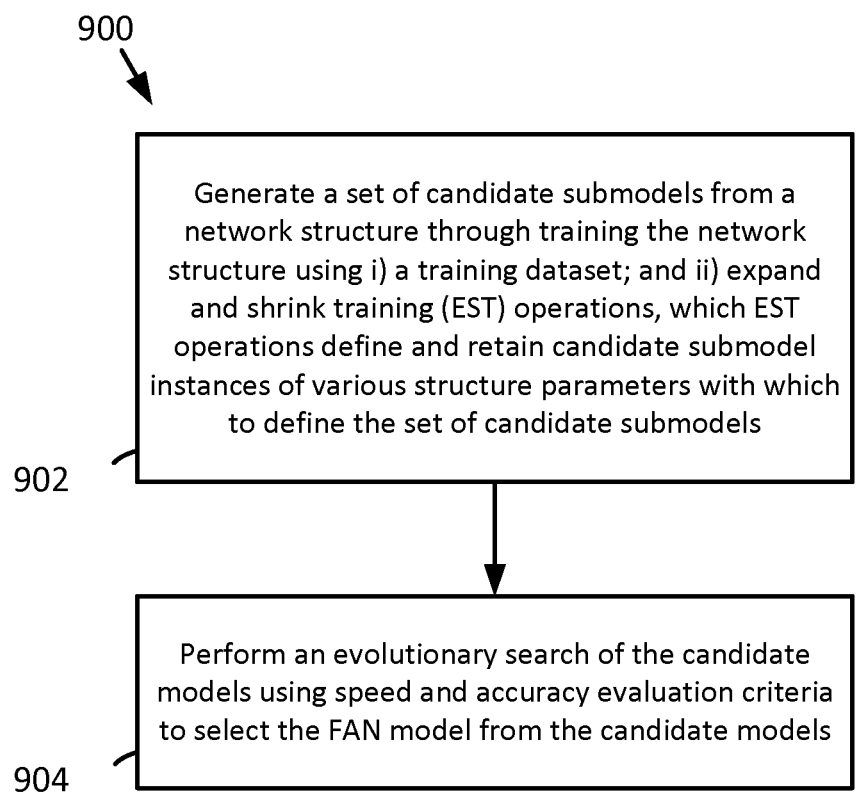
FIG. 9 is a flowchart of operations, in accordance with an embodiment.

FIG. 9 is a flowchart of operations 900 for defining a face alignment network (FAN) model. To define the FAN model, operations at 902 generate a set of candidate submodels from a network structure through training the network structure using i) a training dataset; and ii) expand and shrink training (EST) operations, which EST operations define and retain candidate submodel instances of various structure parameters with which to define the set of candidate submodels.

To select the FAN model from the candidate submodels, operations at 904 perform an evolutionary search of the candidate submodels using speed and accuracy evaluation criteria.

In an embodiment, the FAN model is defined for run-time execution by an edge device to process facial images. For example, an edge device is a smartphone or a tablet.

In an embodiment, the EST operations initiate training from a baseline model previously defined in accordance with the network structure. In an embodiment, the EST operations utilize pre-trained parameters from the baseline model as partially trained parameters in each of the candidate submodels for further training using EST operations. In an embodiment, the candidate submodels are further trained for any one of: between 2 epochs and 60 epochs; between 2 and 25 epochs; and 2 epochs.

In an embodiment, the EST operations activate random subnets in each training iteration to train partial weights of subnets as integral and to train the sharing weights effectively among submodels.

In an embodiment, the EST operations define a search space for generation of candidate submodels in accordance with a plurality of search dimensions comprising: Depth size; Kernel size; Channel ratio; and Expansion ratio. In an embodiment, the EST operations initiate with a small depth size, a small kernel size, a large channel ratio, and a large expansion ratio and then operations, in phases and in the following order, gradually expand depth size and kernel size to respective maximums and, at ending phases, progressively shrink channel ratio and expansion ratio to respective minimums. In an embodiment, the EST operations comprise kernel training operations in an early phase that train a first size kernel and use the first size kernel to subsequently train a second size kernel where the first size kernel is a center of the second size kernel.

In an embodiment, the EST operations comprise depth training operations in a middle phase that train fewer layers and then gradually add larger layer options to the training.

In an embodiment, the EST operations comprise channel ratio and expansion ratio training operations that shrink channel ratio and expansion ratio respectively at end phases.

In an embodiment, the evolutionary search evaluates the baseline model to determine the speed and accuracy evaluation criteria.

In an embodiment, the network structure is a two-stage structure outputting to a Region of Interest (RoI) alignment layer to refine extracted features for prediction. In an embodiment, a first stage comprises four blocks and a second stage comprises one block, each block having a maximum of four layers each comprising an inverted residual layer.

Thus, in an embodiment, a computing device comprises a processing unit coupled to a storage device storing instructions, that when executed by the processing unit, configures the computing device to perform a method according to any one of the method-related embodiments.

Thus, in an embodiment, a computer program product comprises a non-transitory storage device storing instructions and data defining a FAN model for execution by a processing unit of a computing device, where the FAN model is defined in accordance with a method of any one of the method-related embodiments. A similar embodiment relates to a computer program product to define (e.g. through training) such a FAN model.

Thus, in an embodiment, a computing device comprises a processing unit coupled to a storage device storing instructions, that when executed by the processing unit, configure the computing device to provide a FAN model defined in accordance with a method of any one of the method-related embodiments. A similar embodiment relates to a computing device to define (e.g. through training) such a FAN model.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES—INCORPORATED HEREIN BY REFERENCE IN THEIR ENTIRETIES

Cai, H.; Gan, C.; Wang, T.; Zhang, Z.; and Han, S. 2020. Once-for-All: Train One Network and Specialize it for Efficient Deployment.

Chen, Y.; Yang, T.; Zhang, X.; Meng, G.; Xiao, X.; and Sun, J. 2019. DetNAS: Backbone Search for Object Detection. Freedman, D.; Pisani, R.; and Purves, R. 2007. Statistics (international student edition). Pisani, R. Purves, 4th edn. WW Norton & Company, New York.

He, K.; Gkioxari, G.; Doll'ar, P.; and Girshick, R. 2018. Mask R-CNN.

Howard, A. G.; Zhu, M.; Chen, B.; Kalenichenko, D.; Wang, W.; Weyand, T.; Andreetto, M.; and Adam, H. 2017. MobileNets: Efficient Convolutional Neural Networks for Mobile Vision Applications.

Kazemi, V.; and Sullivan, J. 2014. One millisecond face alignment with an ensemble of regression trees. In 2014 IEEE Conference on Computer Vision and Pattern Recognition, 1867-1874. doi: 10.1109/CVPR.2014.241.

Kowalski, M.; Naruniec, J.; and Trzcinski, T. 2017. Deep Alignment Network: A convolutional neural network for robust face alignment.

Li, T.; Yu, Z.; Phung, E.; Duke, B.; Kezele, I.; and Aarabi, P. 2019. Lightweight Real-time Makeup Try-on in Mobile Browsers with Tiny CNN Models for Facial Tracking.

Liu, H.; Simonyan, K.; and Yang, Y. 2019. DARTS: Differentiable Architecture Search.

Liu, Z.; Zhu, X.; Hu, G.; Guo, H.; Tang, M.; Lei, Z.; Robertson, N. M.; and Wang, J. 2019. Semantic Alignment: Finding Semantically Consistent Ground-truth for Facial Landmark Detection.

Nekrasov, V.; Chen, H.; Shen, C.; and Reid, I. 2019. Fast Neural Architecture Search of Compact Semantic Segmentation Models via Auxiliary Cells.

Newell, A.; Yang, K.; and Deng, J. 2016. Stacked Hourglass Networks for Human Pose Estimation.

Real, E.; Aggarwal, A.; Huang, Y.; and Le, Q. V. 2019. Regularized Evolution for Image Classifier Architecture Search.

Sagonas, C.; Tzimiropoulos, G.; Zafeiriou, S.; and Pantic, M. 2013. 300 faces in-the-wild challenge: The first facial landmark localization challenge. In the IEEE International Conference on Computer Vision Workshops.

Sandler, M.; Howard, A.; Zhu, M.; Zhmoginov, A.; and Chen, L.-C. 2019. MobileNetV2: Inverted Residuals and Linear Bottlenecks.

Wu, W.; Qian, C.; Yang, S.; Wang, Q.; Cai, Y.; and Zhou, Q. 2018. Look at boundary: A boundary-aware face alignment algorithm. In the IEEE Conference on Computer Vision and Pattern Recognition.

Yang, S.; Yang, W.; and Cui, Z. 2020. Pose Neural Fabrics Search.

Zhu, B.; Lin, C.; Wang, Q.; Liao, R.; and Qian, C. 2020. Fast and Accurate: Structure Coherence Component for Face Alignment.

Zoph, B.; and Le, Q. V. 2017. Neural Architecture Search with Reinforcement Learning.

What is claimed is:

1. A computer-implemented method comprising:
defining a face alignment network (FAN) model for run-time execution by an edge device to process facial images, wherein the FAN model is a convolutional neural network that receives an image as input and identifies facial landmarks in the image as output, wherein defining comprises:
generating a set of candidate submodels from a network structure through training the network structure using i) a training dataset; and ii) expand and shrink training (EST) operations that define and retain candidate submodel instances of various structure parameters with which to define the set of candidate submodels;
wherein the EST operations initiate training from a baseline model previously defined in accordance with the network structure,
the EST operations define a search space for generation of candidate submodels in accordance with a plurality of search dimensions comprising depth size; kernel size; channel ratio; and expansion ratio;
wherein the EST operations initiate with a small depth size, a small kernel size, a large channel ratio, and a large expansion ratio and then operations, in phases and in the following order, gradually expand depth size and kernel size to respective maximums and, at ending phases, progressively shrink channel ratio and expansion ratio to respective minimums
and the method further includes
performing an evolutionary search of the candidate submodels using speed and accuracy evaluation criteria, and
selecting the FAN model from the candidate submodels based on the evolutionary search,
wherein the evolutionary search:
performs a plurality of cycles comprising:
sampling from a population of candidate submodels to select a quantity of candidate submodels;
selecting an optimal submodel from the quantity of candidate submodels according to at least some of the speed and accuracy evaluation criteria;
evolving the optimal submodel to determine a related submodel;
removing an oldest submodel from the population; and
if the related submodel satisfies a threshold test associated with the speed and accuracy evaluation criteria: adding the related submodel to the population for availability to subsequently sample and adding the related submodel to a set of final candidate submodels; and
following the performance of the plurality of cycles, selects one submodel from the set of final candidate submodels as the FAN model, in accordance with final selection criteria.

2. The method of claim 1, wherein the EST operations utilize pre-trained parameters from the baseline model as partially trained parameters in each of the candidate submodels for further training using EST operations.

3. The method of claim 2, wherein the candidate submodels are further trained for any one of: between 2 epochs and 60 epochs; between 2 and 25 epochs; or 2 epochs.

4. The method of claim 1, wherein the EST operations activate random subnets in each training iteration to train partial weights of subnets as integral and to train the sharing weights effectively among submodels.

5. The method of claim 1, wherein the EST operations comprise kernel training operations in an early phase that train a first size kernel and use the first size kernel to subsequently train a second size kernel where the first size kernel is a center of the second size kernel.

6. The method of claim 4, wherein the EST operations comprise depth training operations in a middle phase that train fewer layers and then gradually add larger layer options to the training.

7. The method of claim 1, wherein: the optimal submodel is a fastest submodel of the quantity of candidate submodels in accordance with a speed criteria, the threshold test is a speed threshold test, and the one submodel is the fastest of the set of final candidate submodels.

8. The method of claim 1, wherein: the optimal submodel is a most accurate of the quantity of candidate submodels in accordance with an accuracy criteria, the threshold test is an accuracy threshold test, and the one submodel is the most accurate of the set of final candidate submodels.

9. The method of claim 1 comprising defining an application comprising the FAN model for execution by the edge device.

10. The method of claim 9, wherein the application is configured to process a video by the FAN model, and wherein the video comprises the facial images.

11. The method of claim 9, wherein the edge device is a smartphone or tablet and the FAN model is configured for execution by a graphics processing unit (GPU).

12. The method of claim 9, wherein the application is any one of:
   a make-up simulation application to simulate the trying on of make-up products on the face;
   a skin analysis application to analyze and score a region or regions of the face for at least one skin sign;
   an effects simulation application to simulate a graphical effect associated with a region of the face; or
   a facial tracking application to track and indicate a location of a face.

13. The method of claim 9, wherein the application comprises a make-up simulation application or a skin analysis application and the application is configured to provide one or both of:
   an interface to an ecommerce purchase service to purchase a product or service associated to make-up and skin treatment respectively; and
   an interface to an ecommerce recommendation service that recommends a product or service associated to make-up and skin treatment respectively.

14. A computing device comprising at least one or more processor coupled to a storage device storing instructions, that when executed by the at least one or more processor, cause the computing device to perform a method comprising:
   defining a face alignment network (FAN) model for run-time execution by an edge device to process facial images, wherein the FAN model is a convolutional neural network that receives an image as input and identifies facial landmarks in the image as output, wherein defining comprises:
   generating a set of candidate submodels from a network structure through training the network structure using i) a training dataset; and ii) expand and shrink training (EST) operations that define and retain candidate submodel instances of various structure parameters with which to define the set of candidate submodels;
   wherein the EST operations initiate training from a baseline model previously defined in accordance with the network structure,
   the EST operations define a search space for generation of candidate submodels in accordance with a plurality of search dimensions comprising depth size: kernel size; channel ratio; and expansion ratio;
   wherein the EST operations initiate with a small depth size, a small kernel size, a large channel ratio, and a large expansion ratio and then operations, in phases and in the following order, gradually expand depth size and kernel size to respective maximums and, at ending phases, progressively shrink channel ratio and expansion ratio to respective minimums
   and the method further includes
   performing an evolutionary search of the candidate submodels using speed and accuracy evaluation criteria, and
   selecting the FAN model from the candidate submodels based on the evolutionary search,
   wherein the evolutionary search:
   performs a plurality of cycles comprising:
   sampling from a population of candidate submodels to select a quantity of candidate submodels;
   selecting an optimal submodel from the quantity of candidate submodels according to at least some of the speed and accuracy evaluation criteria;
   evolving the optimal submodel to determine a related submodel;
   removing an oldest submodel from the population; and
   if the related submodel satisfies a threshold test associated with the speed and accuracy evaluation criteria: adding the related submodel to the population for availability to subsequently sample and adding the related submodel to a set of final candidate submodels; and
   following the performance of the plurality of cycles, selects one submodel from the set of final candidate submodels as the FAN model, in accordance with final selection criteria.

15. A non-transitory computer readable medium including computer executable instructions, wherein the instructions, when executed by computer, cause the computer to perform a method comprising:
   defining a face alignment network (FAN) model for run-time execution by an edge device to process facial images, wherein the FAN model is a convolutional neural network that receives an image as input and identifies facial landmarks in the image as output, wherein defining comprises:
   generating a set of candidate submodels from a network structure through training the network structure using i) a training dataset; and ii) expand and shrink training (EST) operations that define and retain candidate submodel instances of various structure parameters with which to define the set of candidate submodels;
   wherein the EST operations initiate training from a baseline model previously defined in accordance with the network structure,
   the EST operations define a search space for generation of candidate submodels in accordance with a plurality of search dimensions comprising depth size; kernel size; channel ratio; and expansion ratio;
   wherein the EST operations initiate with a small depth size, a small kernel size, a large channel ratio, and a large expansion ratio and then operations, in phases and in the following order, gradually expand depth size and kernel size to respective maximums and, at ending phases, progressively shrink channel ratio and expansion ratio to respective minimums and the method further includes performing an evolutionary search of the candidate submodels using speed and accuracy evaluation criteria, and selecting the FAN model from the candidate submodels based on the evolutionary search, wherein the evolutionary search:

performs a plurality of cycles comprising:

sampling from a population of candidate submodels to select a quantity of candidate submodels;

selecting an optimal submodel from the quantity of candidate submodels according to at least some of the speed and accuracy evaluation criteria;

evolving the optimal submodel to determine a related submodel;

removing an oldest submodel from the population; and if the related submodel satisfies a threshold test associated with the speed and accuracy evaluation criteria: adding the related submodel to the population for availability to subsequently sample and adding the related submodel to a set of final candidate submodels; and following the performance of the plurality of cycles, selects one submodel from the set of final candidate submodels as the FAN model, in accordance with final selection criteria.

* * * * *